(12) United States Patent
Morin et al.

(10) Patent No.: US 8,264,530 B2
(45) Date of Patent: Sep. 11, 2012

(54) METHOD FOR PROCESSING AN IMPRINT IMAGE

(75) Inventors: Aurélie Morin, Paris (FR); Joël-Yann Fourre, Paris (FR); Sylvaine Picard, Paris (FR)

(73) Assignee: Morpho, Paris (FR)

( * ) Notice: Subject to any disclaimer, the term of this patent is extended or adjusted under 35 U.S.C. 154(b) by 493 days.

(21) Appl. No.: 12/521,457

(22) PCT Filed: Jan. 8, 2008

(86) PCT No.: PCT/EP2008/000059
§ 371 (c)(1),
(2), (4) Date: Jun. 26, 2009

(87) PCT Pub. No.: WO2008/083945
PCT Pub. Date: Jul. 17, 2008

(65) Prior Publication Data
US 2010/0321481 A1 Dec. 23, 2010

(30) Foreign Application Priority Data
Jan. 9, 2007 (FR) ...................................... 07 00100

(51) Int. Cl.
*G03B 27/00* (2006.01)
(52) U.S. Cl. .......... 348/77; 382/124; 382/125; 382/126; 382/127
(58) Field of Classification Search .................... 348/77; 382/124–127
See application file for complete search history.

(56) References Cited

U.S. PATENT DOCUMENTS
6,327,376 B1 * 12/2001 Harkin .......................... 382/124
(Continued)

FOREIGN PATENT DOCUMENTS
WO   WO 99/28701    6/1999

OTHER PUBLICATIONS

Parziale et al "The Surround Imager TM: A Multi-camera Touchless Device to Acquire 3D Rolled-Equivalent Fingerprints", Intl. Conf. on Advances in Biometries, Lecture Notes in Computer Science, vol. 3832, pp. 244-250, 2006.*

(Continued)

*Primary Examiner* — Mehrdad Dastouri
*Assistant Examiner* — Mahammed Rahaman
(74) *Attorney, Agent, or Firm* — Gerald E. Helget; Nelson R. Capes; Briggs and Morgan, P.A.

(57) ABSTRACT

A method for processing at least an imprint image of an individual using a processing device that comprises an exhibition glass sheet having a surface for receiving said imprint. The method includes acquiring without contact at least one image of the imprint present in the space upstream from the said surface and which has not yet been in contact with it and detecting the contact between the imprint and the exhibition glass sheet; acquiring by contact at least one image of the imprint after contact with the exhibition glass sheet; and standardizing at least one of the contact-less images in proportions that are identical to those of one of the contact images by analysing at least one of the contact-less images and at least one of the contact images.

13 Claims, 2 Drawing Sheets

U.S. PATENT DOCUMENTS

2005/0271258 A1* 12/2005 Rowe .............................. 382/124
2006/0044282 A1* 3/2006 Pinhanez et al. .............. 345/173
2011/0235872 A1* 9/2011 Rowe et al. ................... 382/124

OTHER PUBLICATIONS

Yi Chen; Parziale, G.; Diaz-Santana, E.; Jain, A.K.; , "3D Touchless Fingerprints: Compatibility with Legacy Rolled Images," Biometric Consortium Conference, 2006 Biometrics Symposium: Special Session on Research at the , vol., No., pp. 1-6, Sep. 19, 2006-Aug. 21, 2006.*

Cappelli, R.; Maio, D.; Maltoni, D.; , "Synthetic fingerprint-database generation," Pattern Recognition, 2002. Proceedings. 16th International Conference on , vol. 3, No., pp. 744-747 vol. 3, 2002.*

Parziale, G et al., "The Surround Imager TM: A Multi-camera Touchless Device to Acquire 3D Rolled-Equivalent Fingerprints", Intl. Conf. on Advances in Biometrics, Lecture Notes in Computer Science, vol. 3832, pp. 244-250, 2006.

* cited by examiner

METHOD FOR PROCESSING AN IMPRINT IMAGE

CROSS REFERENCE TO RELATED APPLICATIONS

The present application is based on and claims priority to International Application PCT/EP2008/000059 filed on Jan. 8, 2008 and French Patent Application No. 07/00100 filed on Jan. 9, 2007, the contents of which are hereby incorporated by reference in their entirety.

BACKGROUND OF THE INVENTION

A method of processing an image of the fingerprint of an individual of the prior art is known, which comprises an acquisition part during which the image thus captured is either compared with reference images or converted into a template that is compared with reference templates.

The identification part of the processing method continues with an identification of the individual if the comparison is positive and non-identification of the individual if the comparison is negative.

The processing method of the prior art is implemented in a processing device comprising an exposure window behind which capture means are disposed.

The image of the imprint can be captured in two distinct ways.

The capture can be made with contact. The image of the imprint is then captured when the finger is in contact with the exposure window. Capture with contact makes it possible to capture images of imprints that are compatible with the majority of existing databases of imprints or templates after conversion.

Capture with contact of the image can be made through a prism and the image is then obtained by virtue of the optical coupling that takes place between the skin and the exposure window and in particular by virtue of the total reflection that is effected on the contact zones between the exposure window and the finger and which allows an increase in contrast. Optical coupling is greatly dependent on the environment, for example in the case of a dry finger the coupling does not take place correctly. One solution then consists of adding a special coating on the exposure window. Such a coating is fragile and the exposure window must then be regularly checked or even replaced.

Capture with contact can take place through a window. The phenomenon of total reflection is no longer used and the capture is no longer dependent on optical coupling. On the other hand, such a capture is greatly dependent on the squashing of the finger and therefore of the imprint on the window. There are few shadows generated and such a capture makes it possible to collect only a small quantity of information. There is then a reduction in contrast related to shadows during contact and therefore losses of information because of the squashing of the imprint.

Capture can take place without contact. The image of the imprint is then captured without the latter being in contact with the exposure window. Capture without contact makes it possible to capture images of the undeformed fingerprint and thus to collect more information characteristic of the imprint on such images than on images with contact, because of better contrast. However, the images of imprints collected are not interoperable with the majority of existing databases of imprints or templates.

The document entitled "The Surround Imager: A Multi-camera Touchless Device to Acquire 3D Rolled-Fingerprints" discloses an imprint capture device without contact, contactless acquisition avoiding deformations of the imprint on an exposure window. The images thus captured are then processed in order to construct a 3D representation of the said imprint.

Since existing imprint databases are based on images of imprints captured with contact, the image of the contactless imprint must be deformed so as to be compatible with the images in existing databases.

To this end, the 3D representation of the imprint is, in the document of the prior art, electronically deformed so as to reproduce the squashing of the imprint on the exposure window. The deformation is here generated automatically without its being necessary to have recourse to an image of the imprint captured with contact.

Such a method that does not take into account the specific elements of each imprint does not make it possible to obtain the best possible results.

SUMMARY OF THE INVENTION

One object of the present invention is to propose a method of processing at least one image of an imprint of an individual that does not have the drawbacks of the prior art and that in particular makes it possible to obtain images of imprints having a maximum amount of information while remaining interoperable with existing databases.

To this end, there is proposed a method of processing at least one image of an imprint of an individual by a processing device comprising an exposure window, one face of which is designed to receive the said imprint, the method comprising:
  a step of contactless capture of at least one contactless image of the imprint present in the space upstream of the said face and that is not yet in contact with it,
  a step of detecting the contact of the said imprint with the exposure window,
  a step of capture with contact of at least one image with contact of the imprint after it is put in contact with the exposure window, and
  a step of standardization of at least one of the contactless images in proportions identical to those of one of the images with contact by analysis of at least one of the contactless images and at least one of the images with contact.

Advantageously, the method comprises, prior to the contactless capture step, a step of detecting the approach of the said imprint of the exposure window.

According to a particular embodiment, the standardization step consists of a location of a plurality of characteristic points common to one of the contactless images and to one of the images with contact, and then a superimposition of the characteristic points of the relevant contactless image with those of the relevant image with contact by the application of geometric transformations to the relevant contactless image.

According to another particular embodiment, the standardization step consists of globally or locally comparing the ridges of at least one contactless image with the frequency of the ridges of at least one image with contact.

Advantageously, the step of detecting the contact of the imprint with the exposure window consists of a comparison of two successive captured images, a determination of a deformation between the two images, and a validation of the contact of the imprint, if the determination is positive.

According to a particular embodiment, the processing method comprises, subsequently to the standardization step, a step of comparing the standardized contactless image with reference imprint images and a step of identifying the individual when the comparison step is positive or a non-identification step when the comparison step is negative.

According to a particular embodiment, the processing method comprises, subsequently to the standardization step, a step of transforming the standardized contactless image into a template and then a step of comparing the said template with reference templates and a step of identifying the individual when the comparison step is positive or a non-identification step when the comparison step is negative.

The invention also proposes a device for processing at least one image of an imprint of an individual comprising:
- an exposure window one face of which is designed to receive the said imprint,
- contactless capture means designed to capture at least one contactless image of the imprint present in the space upstream of the said face and that is not yet in contact therewith,
- first detection means designed to detect the putting of the imprint in contact with the exposure window,
- capture means with contact designed to capture at least one image with contact of the imprint after it is put in contact with the exposure window, and
- standardization means designed to standardized at least one of the contactless images in proportions identical to those of one of the images with contact by analysis of at least one of the contactless images and at least one of the images with contact.

Advantageously, the processing device comprises second detection means designed to detect the approach of the imprint of the exposure window.

Advantageously, the contactless capture means and the capture means with contact are merged.

Advantageously, the standardization means are designed to locate a plurality of characteristic points common to one of the contactless images and to one of the images with contact in order to apply geometric transformations to the relevant contactless image in order to superimpose the characteristic points of the relevant contactless image on those of the relevant image with contact.

Advantageously, the standardization means are designed to globally or locally compare the frequency of ridges of at least one contactless image with the frequency of ridges of at least one image with contact.

Advantageously, the first detection means are designed to compare two successive captured images in order to determine a deformation between the two images and to validate the contact of the imprint.

According to a particular embodiment, the processing device comprises means of comparing the standardized contactless images with reference imprint images and decision means with regard to the identity of the individual.

According to a particular embodiment, the processing device comprises means of transforming the standardized contactless image into a template, means of comparing the template thus created with reference templates and decision means with regard to the identity of the individual.

BRIEF DESCRIPTION OF THE DRAWINGS

The features of the invention mentioned above, as well as others, will emerge more clearly from a reading of the following description of an example embodiment, the said description being given in relation to the accompanying drawings, among which.

DETAILED DESCRIPTION OF THE INVENTION

Figure 1:
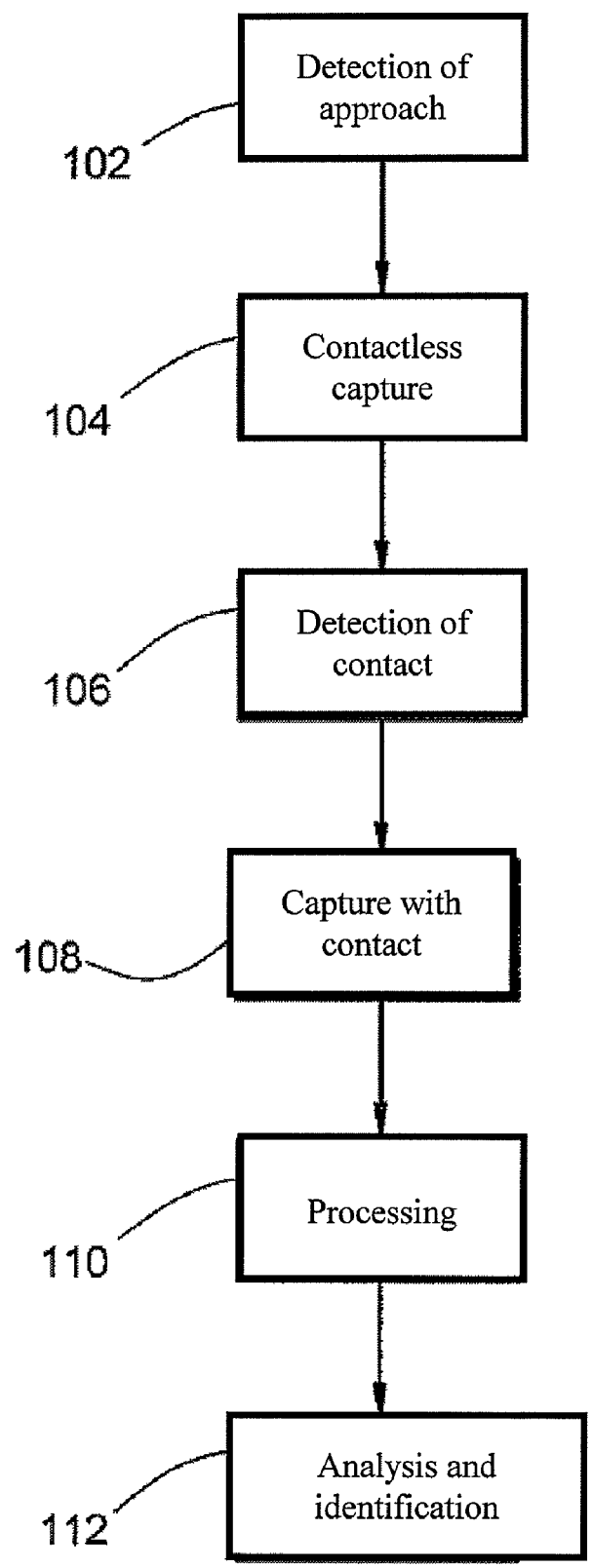
FIG. 1 is an algorithm of a processing method according to the invention.
Figure 2:
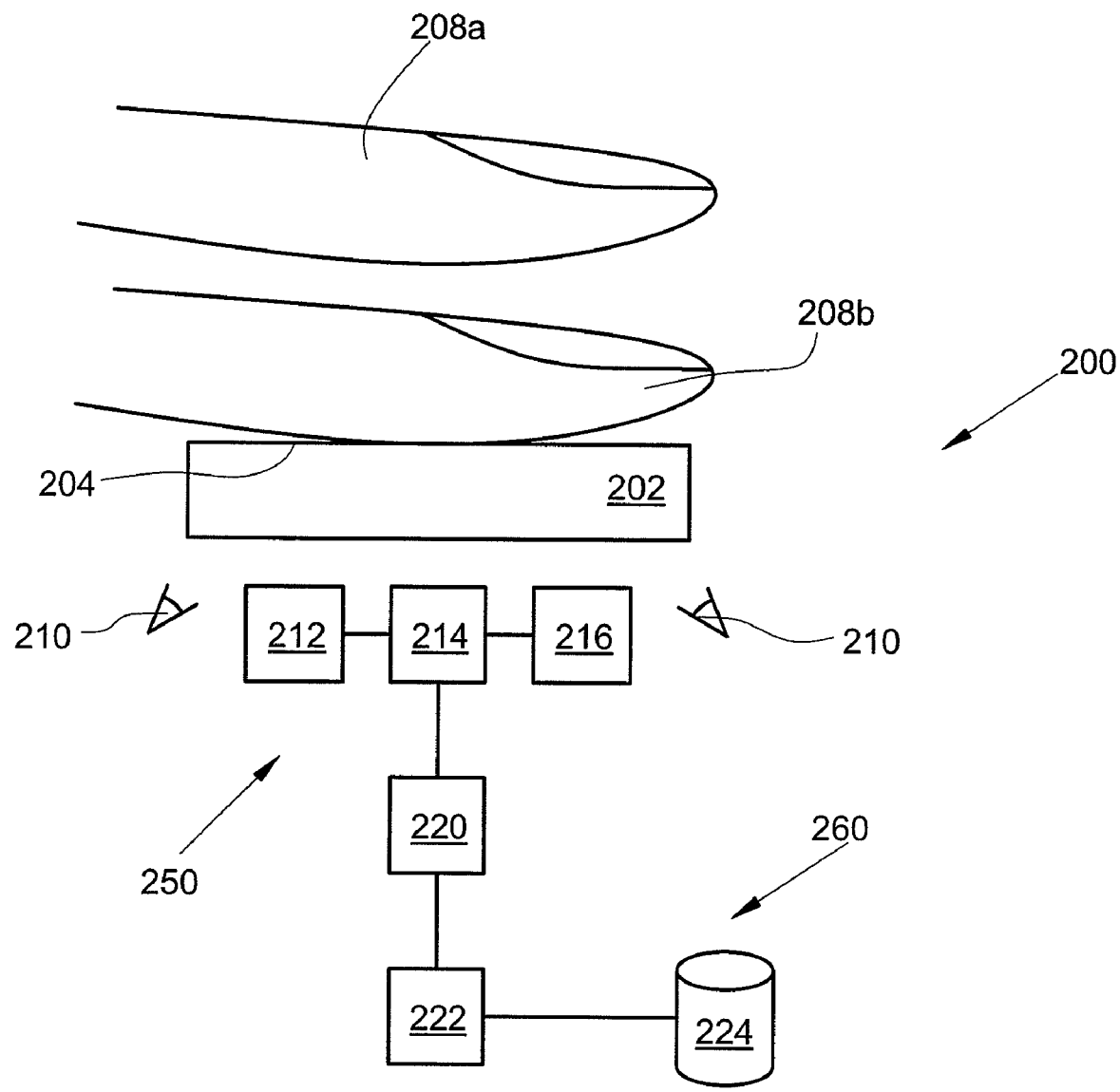
FIG. 2 shows a processing device according to the invention.

FIG. 1 is an algorithm of a method of processing at least one image of an imprint of an individual used by a processing device 200 shown in FIG. 2.

The description that follows is particularly centred on an image of a fingerprint of a finger of an individual but applies in the same way to an image of a palm print, an imprint of several fingers, or more generally any imprint of part of the body of an individual.

An individual wishing to be identified by the processing device 200 moves his finger close to the said device. The finger is here shown in FIG. 2 in a first position in which it is not in contact with the said processing device 200 and in which it is referenced 208a. The same finger is also shown in a second position in which it is in contact with the said processing device 200 and in which it is referenced 208b.

To this end, the processing device 200 comprises an acquisition module 250, which comprises an exposure window 202 on which a contact surface 204 is defined on which the finger 208b and consequently the imprint is placed. In order to improve the contrast of the fingerprint, illumination means 210 are disposed under the exposure window 202 so as to illuminate the finger when it is moved between the first position and the second position, as well as after it is put in contact with the exposure window 202.

According to another embodiment of the invention that is not shown, illumination means are disposed above the exposure window 202 and are oriented so as to illuminate it. This arrangement illuminates the finger 208a during its approach.

According to another embodiment of the invention that is not shown here, illumination means are disposed inside the exposure window 202 and are arranged so as to illuminate it. This arrangement illuminates the finger when it is close to the exposure window 202 or when it is on the exposure window.

The acquisition module 250 comprises:
- contactless capture means 214 designed to capture at least one contactless image of the imprint present in the space upstream of the contact surface 204 and that is not yet in contact therewith,
- first detection means 216 designed to detect the putting of the finger 208b and therefore the imprint in contact with the exposure window 202,
- capture means with contact 214 designed to capture at least one image with contact of the imprint of the said finger 208b after it is put in contact with the exposure window 202, and
- standardization means 220 designed to perform an image processing of at least one of the contactless images according to at least one image with contact. The processing implemented by the standardization means consists in particular of resizing at least one of the contactless images in proportions identical to those of one of the images with contact.

In this embodiment, the processing device 200 captures a multitude of contactless images of the space upstream of the contact surface 204 and, when a contact on the exposure window 202 is detected, the contactless image or images that have been captured just before the said contact bear the imprint of the finger 208a when it approaches the exposure window 202. The space upstream of the contact surface 204 extends above the contact surface 204 in the volume where the finger 208a, 208b is moving. At least one of the contactless images of the upstream space then bears the contactless imprint.

This embodiment consumes a great deal of energy since the processing device 200 continuously captures images that are not used. In order to reduce this consumption, second detection means 212 designed to detect the approach of the finger 208a, and consequently the imprint, to the exposure window 202 are incorporated in the processing device 200.

In the embodiment shown in FIG. 2, the contactless capture means 214 and the capture means with contact 214 are merged and consist for example of a single camera.

According to a particular embodiment, the standardization consists, for the standardization means 220, of locating a plurality of characteristic points common to one of the images of the contactless imprint and one of the images of the imprint with contact, and then applying, to the relevant contactless image, geometric transformations so as to superimpose the characteristic points of the relevant contactless image on those of the relevant image with contact. For this purpose, the standardization means 220 comprise location means designed to locate the said plurality of points, and geometric transformation means designed to apply the said geometric transformations to the relevant contactless image.

According to another embodiment of the invention, the standardization consists, for the standardization means 220, of globally or locally comparing the frequency of ridges of at least one contactless image with the frequency of ridges of at least one image with contact. For this purpose, the standardization means 220 comprise frequency change means designed to determine the frequency of ridges of at least one contactless image and the frequency of ridges of at least one image with contact in order to apply a multiplying factor to the frequency of ridges of the contactless image in order to equalise it with the frequency of ridges of the images with contact and to adjust the dimensions of the contactless image according to this multiplying factor. An imprint comprises ridges which, locally, can be approximated by parallel lines. Locally, it is then possible to define the frequency of ridges as being the number of ridges per unit length. A global frequency can then be deduced therefrom.

That is to say, in general terms, the standardization is carried out by analysis of at least one of the contactless images and at least one of the images with contact.

The acquisition module 250 thus allows the acquisition of at least one image of the contactless fingerprint that has undergone suitable transformations. This image can then be saved in a database in order to become a reference image or be analysed so as to validate or invalidate the identity of the individual.

The position of the centre of the imprint is almost invariant between the captured image with contact and the contactless captured image but the contours and limits of the imprint are stretched on the captured image with contact compared with the captured image without contact. The geometric transformations concerned can be enlargements, rotations or translations, but they concern mainly stretchings along particular axes of the contours and limits of the imprint of the contactless captured image.

The contactless image of the fingerprint 208a thus transformed then contains all the information of the contactless image before transformation and is sized so as to be interoperable with the existing databases. The processing device 200 makes it possible to dispense with optical coupling and allows the acquisition of dry fingers.

Such a processing device 200 also makes it possible to dissociate the exposure window 202 from the capture means 214. It is then possible to offset the latter in order to enclose them in a secure enclosure or to improve the ergonomics of the processing device 200.

In the case where the processing device 200 is designed to validate or invalidate the identity of the individual, it comprises an identification module 260.

The identification module 260 comprises a database 224 and is designed to receive the transformed contactless image and either to compare it with the images on images in the database 224 or to transform it into a template and compare the latter with the templates in the database 224, and then to make a decision with regard to the identity of the individual on the basis of the result of one or other of the comparisons. According to the result of the corresponding comparison, the identification module 260 validates or invalidates the identification of the individual.

For this purpose, the identification module 260 comprises means 222 of comparing at least one standardized contactless image and possibly at least one image with contact with the reference imprint images and decision means 222 with regard to the identity of the individual, when the database 224 contains images of imprints.

When the database 224 contains templates, the identification module 260 comprises means 222 of transforming at least one standardized contactless image into at least one template, means 222 of comparing the or each template thus created with the reference templates and decision means 222 with regard to the identity of the individual.

The second detection means 212 and the first detection means 216 can take various forms. For example, they can consist of infrared transmitters and receivers designed to illuminate the finger 208a, 208b and to determine its distance with respect to the exposure window 202 after reflection. For example, they can consist of calculation means that analyse the various captured images in order to deduce therefrom the moment when the finger comes into contact with the exposure window 202. This is because the deformation of the imprint on contact is sufficiently great to be able to be detected by the said calculation means after comparison between two successive images. The first detection means 216 are then designed to compare two successive captured images in order to determine deformation between the two images and to validate the contact of the finger 208b when a minimum deformation is detected.

The processing method shown in FIG. 1 comprises a part devoted to the capture and standardization of at least one image of the imprint of the finger 208a, 208b.

The processing method comprises:
- a step 104 of contactless capture of at least one contactless image of the imprint present in the space upstream of the said face and that is not yet in contact therewith,
- a step 106 of detecting the contact of the finger 208b and therefore of the imprint with the exposure window 202,
- a step 108 of capturing with contact at least one image with contact of the imprint of the said finger 208b after it is put in contact with the exposure window 202, and
- a step 110 of processing at least one of the contactless images according to at least one image with contact by standardization, and in particular resizing, of the contactless image in proportions identical to those of the image with contact. The processing step 110 thus constitutes a standardization step.

The acquisition method thus allows the acquisition of at least one image of the imprint of the finger without contact that has undergone suitable transformations.

As described above, during the processing method, a multitude of images are captured before detection of the contact of the finger 208b on the exposure window 202 and the standardization applied to the image or images captured just before contact, that is to say to the images of the imprint of the finger 208a that were captured during its approach.

In order to limit the energy consumption, a step 102 of detecting the approach of the finger 208a, and consequently of the imprint, to the exposure window 202 is put in place prior to the contactless capture step 104.

According to a particular embodiment, the standardization step 110 consists of a location of a plurality of characteristic points common to one of the images of the contactless imprint and to one of the images of the imprint with contact, and then a superimposition of the characteristic points of the relevant contactless image on those of the relevant image with contact by applying geometric transformations to the relevant contactless image.

According to another embodiment, the standardization step consists of globally or locally comparing the frequency of ridges of at least one contactless image with the frequency of the ridges of at least one image with contact.

That is to say, in general terms, the standardization takes place by analysing at least one of the contactless images and at least one of the images with contact. Thus the standardization takes into account both the image with contact and the contactless image, thus allowing a better taking into account of the specificities of each imprint.

According to a particular embodiment, the step 106 of detecting the contact of the finger 208b with the exposure window 202 consists of a comparison of two successive captured images, a determination of a deformation between the two images and a validation of the contact of the finger 208b if the determination is positive.

In the case where the processing method is designed to validate or invalidate the identity of the individual, it comprises, subsequently to the standardization step 110, a step of comparing at least one standardized contactless image and possibly at least one image with contact with reference imprint images and a step of identifying the individual when the comparison step is positive or a step of non-identification when the comparison step is negative.

When the database 224 contains reference templates, the processing method comprises, subsequently to the standardization step 110, a step of transforming at least one standardized contactless image into at least one template and then a step of comparing the or each template with reference templates and a step of identifying the individual when the comparison step is positive and a step of non-identification when the comparison step is negative.

It is possible to implement other embodiments in which, using several images (without contact and standardized and with contact) several comparisons are made, or a template is generated and compared with the reference templates. The template formed from several images provides more information and allows better identification.

It is also possible, from several images, to reconstruct a single image of better quality comprising both the information issuing from the standardized contactless images and the images with contact.

The certainty of the identification is more important than in the case of the identification of the prior art because the images or templates compared carry a larger number of items of information.

In addition, the capture of contactless images affords a saving in time compared with the techniques of the prior art since images are captured prior to the putting of the finger 208b in contact.

Naturally the present invention is not limited to the examples and embodiments described and depicted but is capable of numerous variants accessible to persons skilled in the art.

For example, in the case where the part concerns a set of several fingers that come into contact with the contact surface, each finger can be processed independently from the others. This is because not all the fingers necessarily come into contact with the contact surface simultaneously. Each contact can be detected and give rise to a processing method in accordance with that of the invention.

The identification of the individual can then relate to all the fingers or to only some of them.

The invention claimed is:

1. A method of processing at least one image of an imprint of an individual by a processing device comprising an exposure window one face of which is designed to receive the said imprint, the method comprising:
   a step of detection of an approach of the said imprint to the said exposure window;
   immediately after detecting the approach of the said imprint a step of capture of at least one contactless image of the imprint present in the space upstream of the said face and that is not yet in contact with it;
   immediately after capturing of the at least one contactless image of the imprint a step of detecting the contact of the said imprint with the exposure window;
   a step of capture with contact of at least one image with contact of the imprint immediately after it is put in contact with the exposure window; and
   a step of standardization of the at least one contactless image according to at least one of the images with contact by analysis of the at least one contactless image and the at least one image with contact, wherein the standardization includes resizing of the at least one contactless image in proportions identical to the at least one of the image with contact.

2. The processing method of claim 1, wherein the standardization step consists of a location of a plurality of characteristic points common to the at least one contactless image and to the at least one image with contact, and then a superimposition of the characteristic points of the relevant contactless image on those of the relevant image with contact by the application of geometric transformations to the relevant contactless image.

3. The processing method of claim 1, wherein the standardization step consists of globally or locally comparing the frequency of ridges of the at least one contactless image with the frequency of ridges of the at least one image with contact.

4. The processing method of claim 1, wherein the step of detecting the contact of the imprint with the exposure window consists of a comparison of two successive captured images, a determination of a deformation between the two images, and a validation of the contact of the imprint if the determination is positive.

5. The processing method of claim 1, wherein the method comprises, subsequently to the standardization step, a step of comparing at least one standardized contactless image and possibly at least one image with contact with reference imprint images and a step of identifying the individual when the comparison step is positive or a non-identification step when the comparison step is negative.

6. The processing method of claim 1, wherein the method comprises, subsequently to the standardization step, a step of transformation of at least one standardized contactless image into at least one template and then a step of comparing the template with reference templates and a step of identifying the individual when the comparison step is positive or a non-identification step when the comparison step is negative.

7. A device for processing at least one image of an imprint of an individual, comprising:
   an exposure window one face of which is designed to receive the said imprint;
   a first detection means designed to detect an approach of the imprint to the exposure window;
   a contactless means for capturing designed to capture at least one contactless image of the imprint present in the space upstream of the said face and that is not yet in contact therewith, wherein the at least one contactless image is captured immediately after said approach of the imprint to the exposure window is detected by the first detection means;
   a second detection means designed to detect the putting of the imprint in contact with the exposure window, immediately after capturing of the at least one contactless image of the imprint by the contactless means for capturing;
   a means for capturing with contact designed to capture at least one image with contact of the imprint immediately after it is put in contact with the exposure window; and
   a standardization means designed to standardize the at least one contactless image according to at least one of the images with contact by analysis of the at least one of the contactless image and the at least one image with contact, wherein the standardization includes resizing of the at least one contactless image in proportions identical to the at least one of the image with contact.

8. The processing device of claim 7, wherein the means for capturing at least one contactless image and the means for capturing at least one image with contact are merged.

9. The processing device of claim 7, wherein the means for standardizing is designed to locate a plurality of characteristic points common to one of the contactless images and to one of the images with contact, to apply geometric transformations to the relevant contactless image in order to superimpose the characteristic points of the relevant contactless image on those of the relevant image with contact.

10. The processing device of claim 7, wherein the means for standardizing is designed to globally or locally compare the frequency of ridges of at least one contactless image with the frequency of ridges of at least one image with contact.

11. The processing device of claim 7, wherein the means for detecting the putting of the imprint in contact with the exposure window is designed to compare two successive captured images in order to determine a deformation between the two images and to validate the contact of the imprint.

12. The processing device of claim 7, wherein the device comprises means of comparing at least one standardized contactless image and possibly at least one image with contact with reference imprint images and decision means with regard to the identity of the individual.

13. The processing device of claim 7, wherein the device comprises means of transforming at least one standardized contactless image into at least one template, means of comparing each template thus created with reference templates and decision means with regard to the identity of the individual.

* * * * *